(12) United States Patent
Hosotsubo

(10) Patent No.: US 9,019,542 B2
(45) Date of Patent: Apr. 28, 2015

(54) MANAGEMENT SERVER AND METHOD FOR CONTROLLING THE SAME

(71) Applicant: Canon Kabushiki Kaisha, Tokyo (JP)

(72) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/167,777

(22) Filed: Jan. 29, 2014

(65) Prior Publication Data

US 2014/0211256 A1 Jul. 31, 2014

(30) Foreign Application Priority Data

Jan. 31, 2013 (JP) .................................. 2013-017298

(51) Int. Cl.
G06F 15/00 (2006.01)
G06F 3/12 (2006.01)
H04N 1/00 (2006.01)

(52) U.S. Cl.
CPC .......... *G06F 3/1273* (2013.01); *H04N 1/00042* (2013.01); *G06F 3/1219* (2013.01); *G06F 3/1285* (2013.01)

(58) Field of Classification Search
CPC .......................... G06F 3/1273; H04N 1/00042
USPC ......................................................... 358/1.15
See application file for complete search history.

(56) References Cited

U.S. PATENT DOCUMENTS

2009/0231609 A1* 9/2009 Chipchase et al. ........... 358/1.15
2010/0128309 A1* 5/2010 Matoba ......................... 358/1.15

FOREIGN PATENT DOCUMENTS

JP 2012-011597 A 1/2012

* cited by examiner

*Primary Examiner* — Saeid Ebrahimi Dehkordy
(74) *Attorney, Agent, or Firm* — Canon U.S.A. Inc., IP Division

(57) ABSTRACT

There is provided a management server in which a print log analysis unit of a device management application analyzes a job log collected from an MFP device to detect a pair of reprint related jobs, determines whether a reprinted job is useless or useful for the detected pair of jobs, and a print log analysis result report generation unit generates an analysis result report based on a determination result to outputs the generated report. If a detection result includes a pair of jobs, in which one job has been printed based on default print settings and the other job has been reprinted based on changed print settings, it is determined that the job printed based on the default print settings is a useless job.

9 Claims, 9 Drawing Sheets

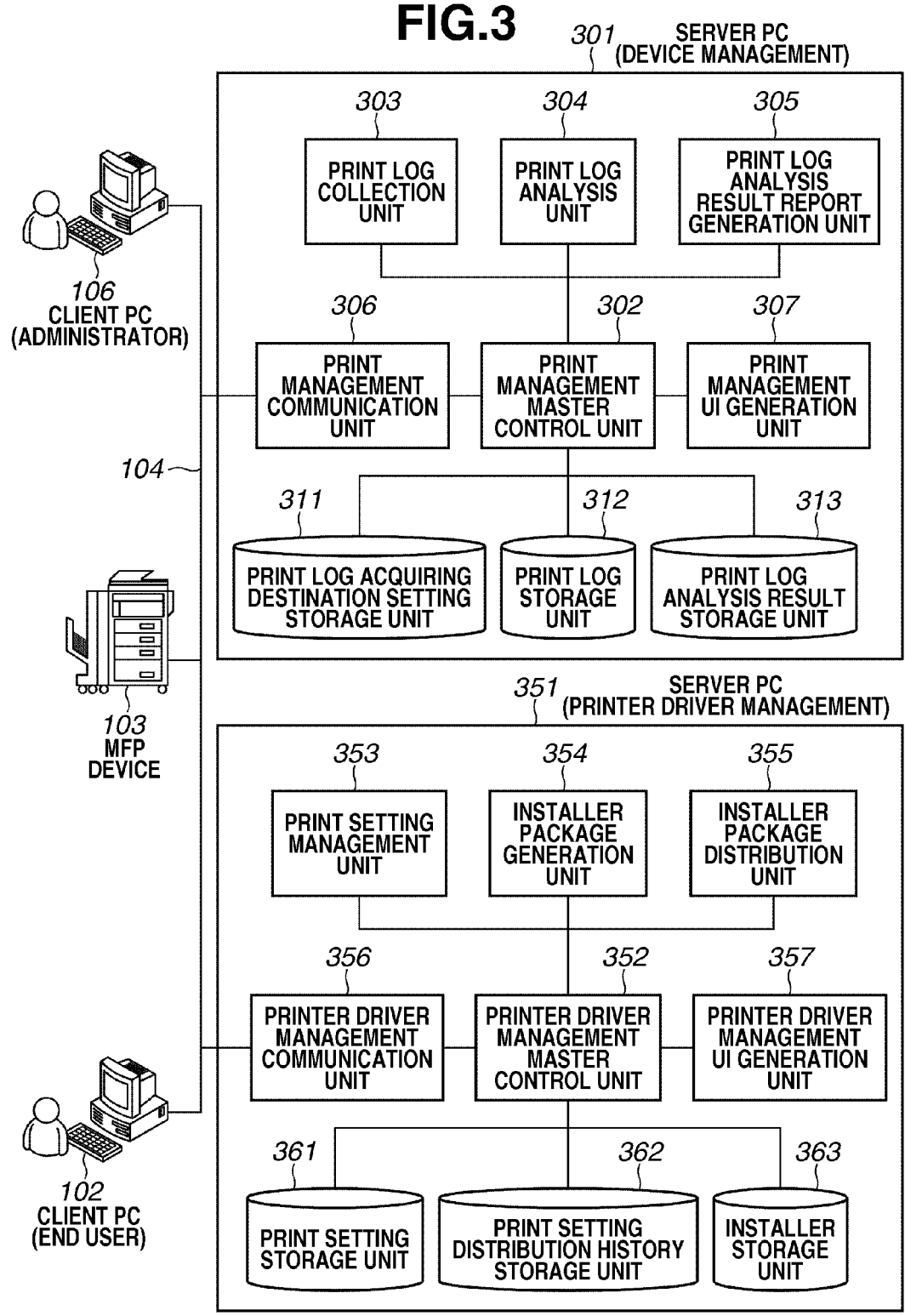

FIG.4

| | 401 | 402 | 403 | 404 | 405 | 406 | 407 | 408 | 409 | 410 | 411 | 412 | 413 | 414 | 415 |
|---|---|---|---|---|---|---|---|---|---|---|---|---|---|---|---|
| | PRINT LOG ID | PRINTER NAME | JOB NAME | | PRINT USER | PRINT START DATE AND TIME | PRINT TERMINATION DATE AND TIME | NUMBER OF PAGES | COLOR SUM | MONOCHROME SUM | PAPER SIZE | TWO-SIDED | 2in1 | 4in1 OR MORE | NUMBER OF SHEETS ×NUMBER OF COPIES |
| 421 | job5311 | MFP2XXX | MATERIAL 1.pdf | | user1 | 2013/03/01 09:05 | 2013/03/01 09:05 | 4 | 2 | 2 | A4 | 1 | 1 | 0 | 1×2 |
| 422 | job5312 | MFP2XXX | Micxxsoft PowerPxxxt - MATERIAL 3.ppt [COMPATIBILITY] | | user3 | 2013/03/01 09:07 | 2013/03/01 09:08 | 8 | 8 | 0 | A3 | 1 | 1 | 0 | 2×2 |
| 423 | job5313 | MFP2XXX | MATERIAL 1.pdf | | user1 | 2013/03/01 09:08 | 2013/03/01 09:08 | 4 | 2 | 2 | A4 | 0 | 1 | 0 | 2×2 |
| 424 | job5314 | MFP3XXX | ESTIMATE 4.pdf | | user2 | 2013/03/01 09:10 | 2013/03/01 09:11 | 1 | 1 | 0 | A4 | 0 | 1 | 0 | 1×1 |
| 425 | job5315 | MFP3XXX | Micxxsoft Wxxd - APPROVAL A.docx | | user2 | 2013/03/01 09:14 | 2013/03/01 09:14 | 4 | 4 | 0 | A3 | 1 | 1 | 0 | 1×2 |
| 426 | job5316 | LBP4XXX | 12345678901234567890123456789012 | | user5 | 2013/03/01 09:02 | 2013/03/01 09:03 | 3 | 3 | 0 | A4 | 0 | 0 | 0 | 3×1 |
| 427 | job5317 | LBP4XXX | Micxxsoft Wxxd - EventSummary_00 | | user7 | 2013/03/01 09:14 | 2013/03/01 09:14 | 64 | 64 | 0 | A4 | 1 | 0 | 1 | 8×4 |

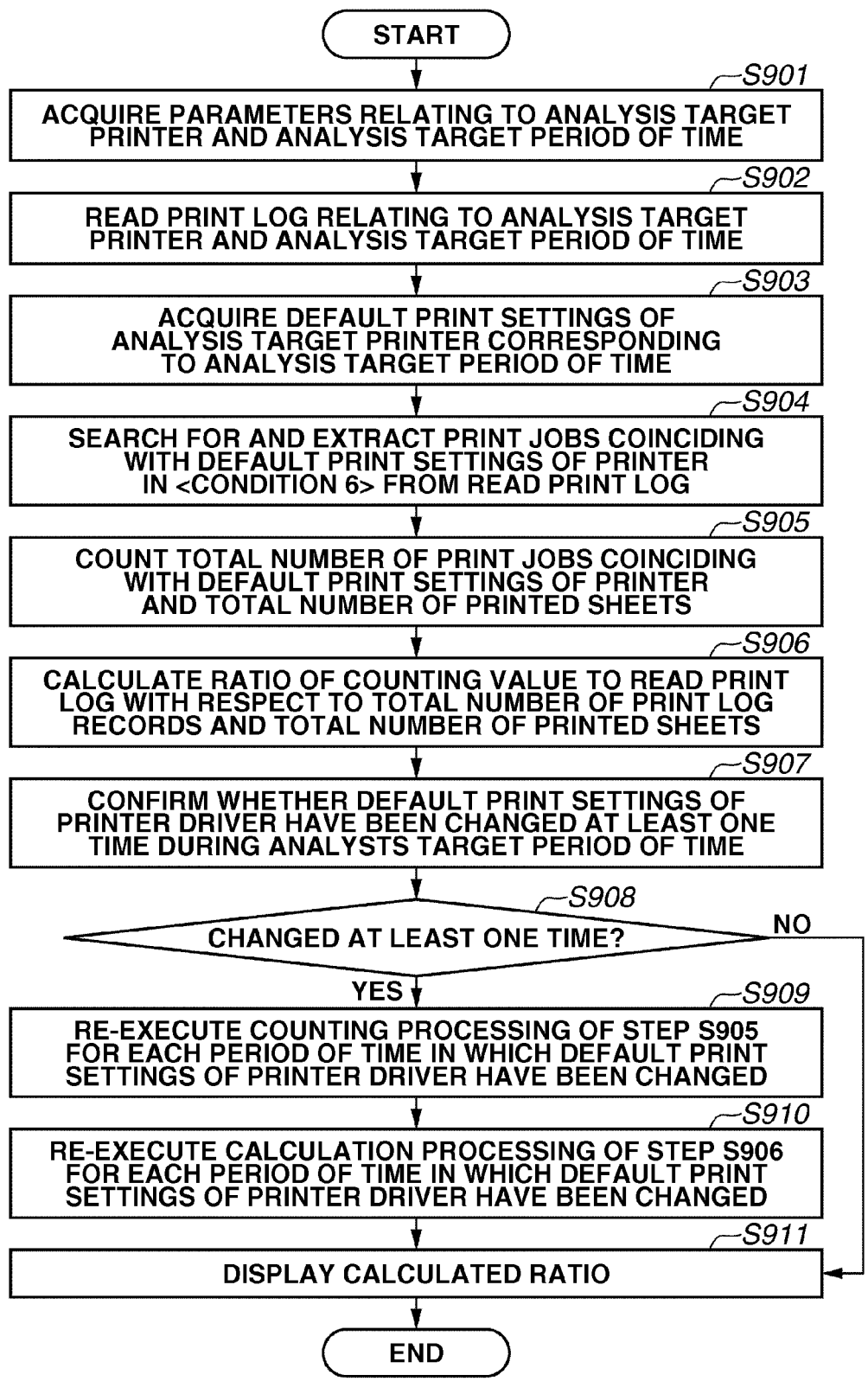

MANAGEMENT SERVER AND METHOD FOR CONTROLLING THE SAME

BACKGROUND OF THE INVENTION

1. Field of the Invention

The present invention relates to a management server and a method for controlling the management server to analyze the use tendency of a user with reference to print job history of a printer and visualize the analysis result.

2. Description of the Related Art

Conventionally, to reduce the total cost of ownership (TCO), such as papers, toners, and electric power consumed for printers, it is useful for a device administrator to change default print settings of a printer driver in such a way as to prioritize 2in1 or two-sided setting over the original setting and distribute the updated printer driver to users. However, if a desired print result cannot be obtained when each user performs printing of a document based on the changed default print settings of the printer driver distributed by the device administrator, the user reprints the same document while changing the distributed print settings to select a desired (e.g., 1in1) setting according to user's preference in many case.

As discussed in Japanese Patent Application Laid-Open No. 2012-011597, it is conventionally known to realize the TCO reduction by performing a print operation based on print settings distributed by a device administrator. The conventional method discussed in the above-mentioned conventional technique includes acquiring print setting values recommended by a device administrator and average print settings having been selected by a user. Further, the conventional method includes comparing two acquired setting values and calculating TCO and CO2 reduction effects if there is any difference in print settings. The conventional method further includes displaying at least one print setting, as a candidate to be changed, together with calculated reduction effects, before the user starts a printing operation. The user selects an appropriate print setting and performs the printing operation based on the changed print settings. Therefore, respective users can perform printing operations while confirming cost reduction effects. This is effective in encouraging each user to keep cost reductions in mind.

The above-mentioned conventional technique is preferably employed in a case where the printing operation is performed after a print job is once stored in a print job storage server or in a printer. In other words, in a case where a printing operation is directly instructed from the printer driver to the printer, the printing operation is automatically performed based on the default settings of the printer driver having been set beforehand by the device administrator. Therefore, the above-mentioned conventional technique is not useful if the printing is directly instructed from the printer driver to the printer, because the above-mentioned conventional technique cannot eliminate a useless reprint of the same document that may occur when the print settings having been set by the device administrator are dissatisfactory.

Conventionally, there is not any useful way of visualizing a reprint of the same document if it occurs because of dissatisfactory print settings having been set by the device administrator. Therefore, it was difficult for the device administrator to be aware of the amount of useless reprint operations performed in an office.

SUMMARY OF THE INVENTION

The present invention is directed to a technique capable of visualizing useless document reprint operations and providing a system capable of assisting cost reduction activities to be performed by a device administrator.

According to an aspect of the present invention, a management server includes a detection unit configured to detect a pair of reprint related jobs by analyzing a job log collected from a printing apparatus, a determination unit configured to determine whether a reprinted job is useless or useful for the pair of jobs detected by the detection unit, and an output unit configured to output a determination result obtained by the determination unit, wherein if a detection result obtained by the detection unit includes a pair of jobs, in which one job has been printed based on default print settings and the other job has been reprinted based on changed print settings, the determination unit determines the job printed based on the default print settings as a useless job.

Further features of the present invention will become apparent from the following description of exemplary embodiments with reference to the attached drawings.

BRIEF DESCRIPTION OF THE DRAWINGS

FIG. 3 illustrates a software module configuration of the print management system according to the present invention.

FIG. 4 is a table illustrating an example of a print log stored in a print log storage unit.

FIG. 9 is a flowchart illustrating an example of processing that can be performed by the device management application according to a second exemplary embodiment.

DESCRIPTION OF THE EMBODIMENTS

Various exemplary embodiments, features, and aspects of the invention will be described in detail below with reference to the drawings.

Figure 1:
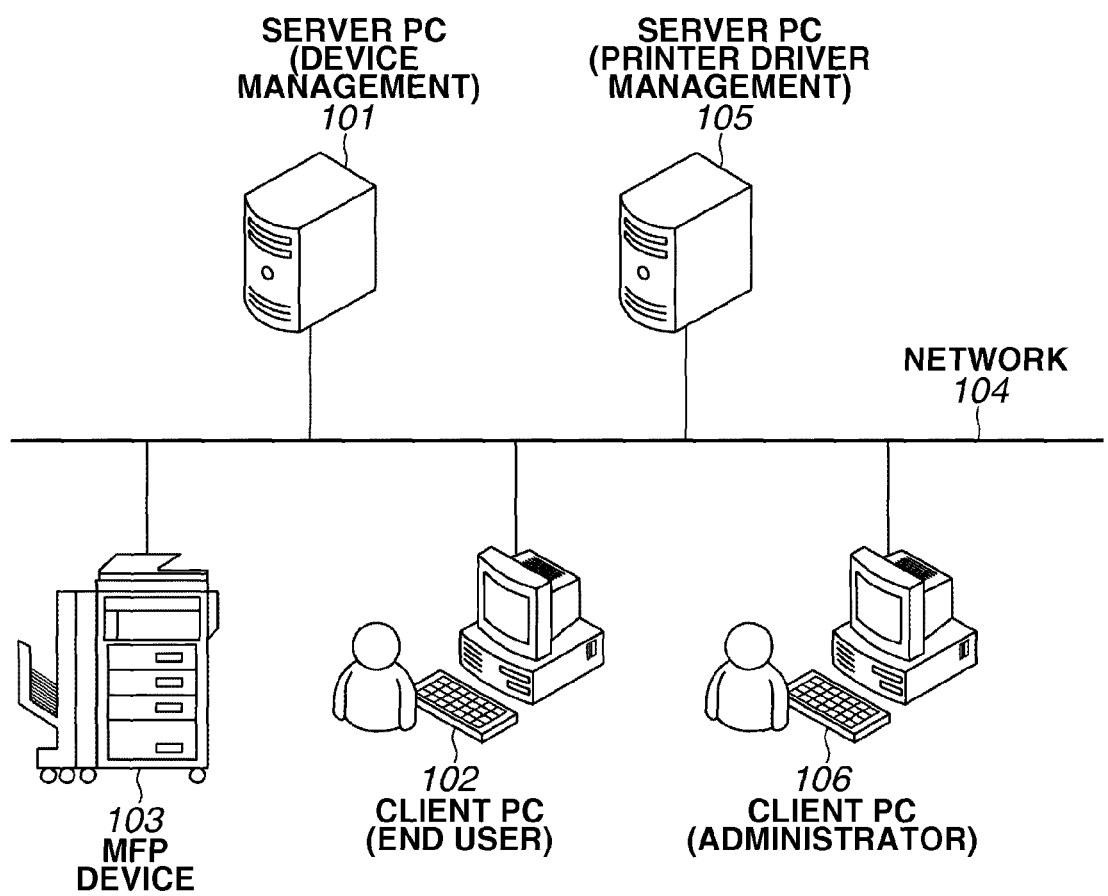
FIG. 1 schematically illustrates a print management system according to an exemplary embodiment of the present invention.

FIG. 1 schematically illustrates a print management system according to an exemplary embodiment of the present invention.

As illustrated in FIG. 1, the print management system according to the present exemplary embodiment includes a device management server 101, a printer driver management server 105, an end user client PC 102, an administrator client PC 106, and a multifunction peripheral (MFP) device 103 having a printing function, which are mutually connected via a network 104 (e.g., internet or local area network (LAN)).

The device management server PC 101 is a server on which a device management application is operating. The printer driver management server 105 is a server on which a printer driver management application is operating. The printer driver management application can push install a printer driver that can operate the MFP device 103 on the end user client PC 102. An administrator can individually customize default print settings of the printer driver to be push installed.

The end user client PC 102 is a personal computer (PC) that can transmit a print job to the MFP device 103, using the printer driver having been push installed by the printer driver management application.

The administrator client PC 106 can access the device management server 101 via a web browser installed thereon to acquire print management information and display the acquired information. Further, the administrator client PC 106 can access the printer driver management server 105 via the web browser to change default print settings of a printer driver to be distributed to an end user of each MFP device.

Although not illustrated in FIG. 1, a plurality of end user client PCs other than the end user client PC 102 can be connected to the network 104. Further, a plurality of printers other than the MFP device 103 can be connected to the network 104. Hereinafter, a device referred to as "printer" is a printing apparatus (MFP, printer, etc.) including the MFP device 103. The present invention is applicable to any other device having a printing function.

Further, a plurality of administrator client PCs other than the administrator client PC 106 may be connected to the network 104. Further, the device management server 101 and the printer driver management server 105 can be integrated as a single server, although they are illustrated as different servers in FIG. 1. Further, the end user client PC 102 and the administrator client PC 106 may be integrated as a single client PC.

<Hardware Configuration>

Figure 2A:
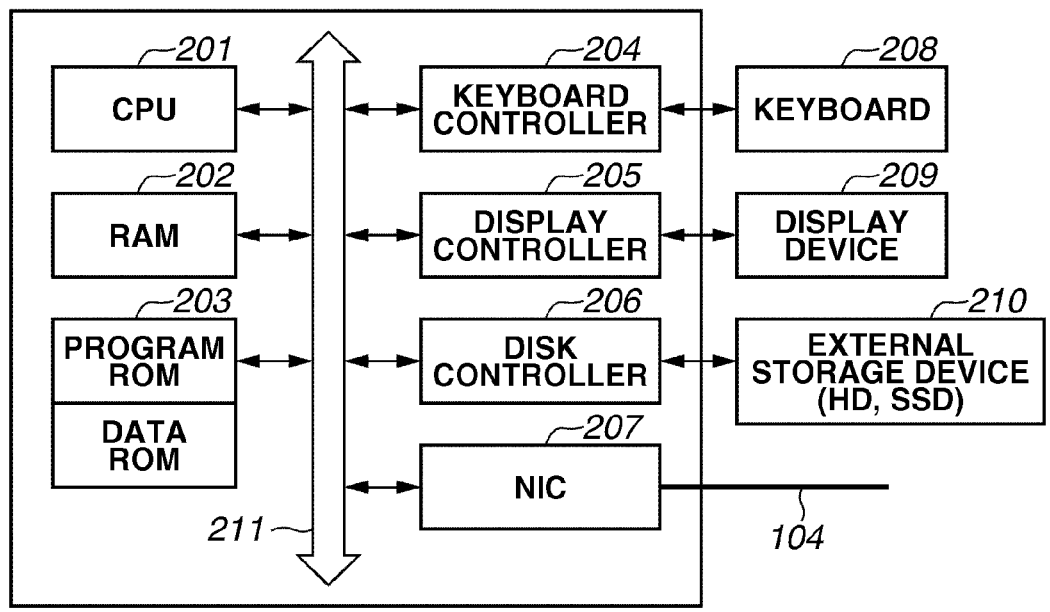
FIGS. 2A and 2B are block diagrams illustrating a hardware configuration of apparatuses that constitute the print management system according to the present invention.
Figure 2B:
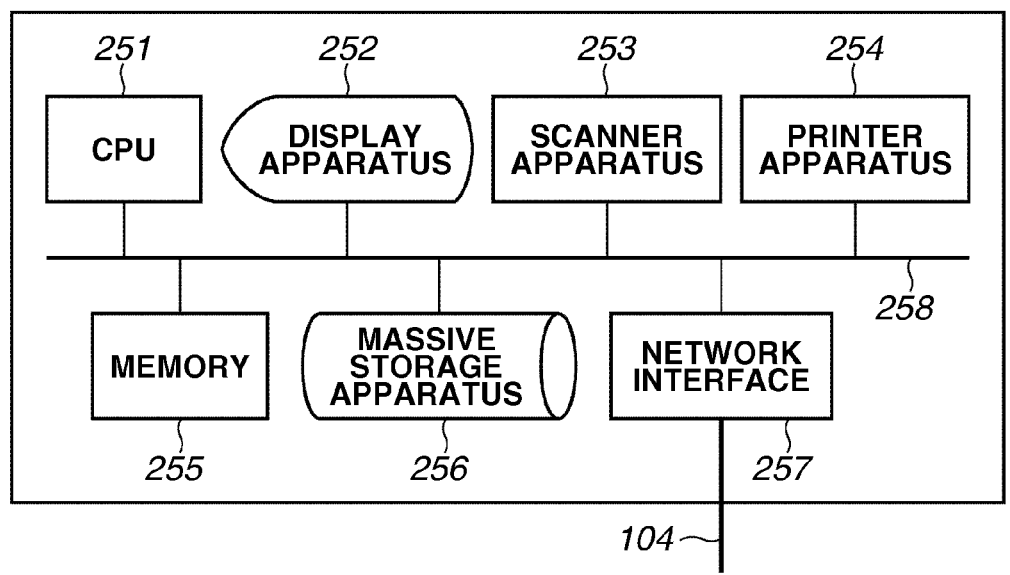

FIGS. 2A and 2B illustrate an example of the hardware configuration of each PC and the MFP device, which cooperatively constitute the print management system according to the present exemplary embodiment. A hardware configuration of a general information processing apparatus illustrated in FIG. 2A is applicable to the server and the client PC according to the present exemplary embodiment.

FIG. 2A illustrates a hardware configuration of an information processing apparatus (i.e., PCs 101, 102, 105, and 106).

A central processing unit (CPU) 201 can execute various programs, including an operating system (OS) and applications, when they are loaded into a memory, such as a read only memory (ROM) 203 or a random access memory (RAM) 202. To realize processing of each flowchart described below, the CPU 201 executes a computer-readable program loaded from the ROM 203 or an external storage device 210. More specifically, when the above-mentioned programs are installed on a computer, the computer is functionally operable as various processing units that perform various processing of the flowcharts described below.

The RAM 202 is a main memory of the CPU 201 and is functionally operable as a work area for the CPU 201. The ROM 203 includes a program ROM that stores programs to be executed by the CPU 201 and a data ROM that stores various data.

A keyboard controller 204 can control key and point information that can be input via pointing devices, such as a keyboard 208 and a mouse (not illustrated). A display controller 205 can control contents to be displayed on a display device 209 (i.e., a display unit). A disk controller 206 can control data accesses to the external storage device 210 (e.g., a hard disk drive (HDD) or a solid state drive (SSD)) that can store various data. A network interface card (NIC) 207 can control communications with other devices connected via the network 104.

The external storage device 210 stores various programs (including the OS and applications) and a file system composed of various files that can be managed by the OS. A mutual connection bus 211 can serve as an intermediary that enables respective blocks to communicate with each other under the control of the CPU 201.

FIG. 2B is a block diagram illustrating an example of a hardware configuration of the MFP device 103.

In FIG. 2B, a CPU 251 is connected to each functional device described below via an internal bus 258 and can control operations to be performed by the MFP device 103. A memory 255 is functionally operable as a main memory of the CPU 251 and is functionally operable as a work area usable to execute a program (e.g., the OS or an application) when the CPU 251 controls the MFP device 103. A massive storage apparatus 256 stores computer-readable application programs that can be loaded into the memory 255 by the CPU 251. Further, the massive storage apparatus 256 can be used to store scanned documents having been read by a scanner apparatus 253. Further, when a printer apparatus 254 performs print job processing, the massive storage apparatus 256 can store processing history, which is referred to as "print log."

A display apparatus 252 is, for example, a touch panel (i.e., an operation panel) configured to display an operation screen. In the present exemplary embodiment, the operation screen displayed on the touch panel of the display apparatus 252 enables a user to perform a desired operation. A network interface 257 can perform processing for controlling communications with other devices connected via the network 104.

The scanner apparatus 253 has an auto document feeder function to read documents. The printer apparatus 254 can receive a print job from the end user client PC 102 via the network interface 257 and can output a printed product based on the received print job. Further, the printer apparatus 254 has a copy function of printing an image read from the scanner apparatus 253.

<Configurations of Device Management Server and Printer Driver Management Server>

FIG. 3 illustrates a software module configuration of the device management application and the printer driver management application. A device management application 301 can be executed by the hardware of the device management server 101. To realize the device management application 301, the CPU 201 of the device management server 101 executes a computer-readable program loaded from the external storage device 210. A printer driver management application 351 can be executed by the hardware of the printer driver management server 105. To realize the printer driver management application 351, the CPU 201 of the printer driver management server 105 executes a computer-readable program loaded from the external storage device 210.

First, the device management application 301 is described in detail below. The device management application 301 includes a print management master control unit 302 that is operable as a main processing unit of the device management application 301. The print management master control unit 302 is configured to control operations to be performed by other processing units 303 to 307 included in the device management application 301.

The print log collection unit 303 is configured to periodically collect print logs from the MFP device 103 via the print management communication unit 306 and store the collected print logs in a print log storage unit 312. The print log collected in this case is an updated amount, which is a difference from that in the previous periodical collection processing. The print log collection unit 303 is configured to identify an MFP device (i.e., a print log collection target) based on setting values stored in a print log acquiring destination setting storage unit 311. Further, after the print log collection in the MFP device 103 is completed, the print log collection unit 303 stores the last number (log ID) of the device print log for the next processing, as one of the setting values, in the print log acquiring destination setting storage unit 311.

The print log analysis unit 304 is configured to analyze the print logs stored in the print log storage unit 312 according to an analyzing method described below. The print log analysis unit 304 is configured to store analysis results of the print logs in a print log analysis result storage unit 313. The print log analysis result report generation unit 305 is configured to count the print log analysis results stored in the print log analysis result storage unit 313 and generate a report that can be displayed on a print management UI.

The print management UI generation unit 307 is configured to generate a print management web UI in response to a request from the web browser of the administrator client PC 106 and transmit the generated print management web UI to the web browser. The web UI is constituted by hypertext markup language (HTML) and scripts that can be executed by the client PC. The print management web UI generated by the print management UI generation unit 307 enables a device administrator to confirm analysis and counting results of a print job as described in detail below with reference to FIG. 5.

The print management communication unit 306 is configured to serve as an intermediary to transmit a request from the web browser of the administrator client PC 106 to the print management master control unit 302 and is further configured to serve as an intermediary to transmit a reply responding to the request from the print management master control unit 302 to the web browser.

The print log acquiring destination setting storage unit 311 is configured to store information about a print log collection target MFP device connected to the network 104 (i.e., print log acquiring destination information) in the external storage device (e.g., the hard disk) 210. The print log acquiring destination setting storage unit 311 is configured to store device name and IP address as information about a print log acquiring destination MFP device (i.e., print log acquiring destination information). Further, the print log acquiring destination setting storage unit 311 is configured to store information about device print log acquiring time interval and lastly acquired print log ID.

The setting of the print log acquiring destination (i.e., print log acquiring destination information) can be performed by selecting a target MFP device on the print management web UI that can be displayed by the web browser of the administrator client PC 106. In this case, it is feasible to set information about the device print log acquiring time interval. Further, the information about the lastly acquired print log ID can be set, as mentioned above, after the collection by the print log collection unit 303 is completed. A numerical value "0" indicating "uncollected" is stored for an MFP device if the collection is not yet performed for the MFP device.

The print log storage unit 312 is configured to store print logs collected from respective MFP devices in the external storage device (e.g., the hard disk) 210. The print log analysis result storage unit 313 is configured to store analysis results of print logs analyzed by the print log analysis unit 304 in the external storage device (e.g., the hard disk) 210. As a print log collection method, the MFP device 103 may periodically transmit each updated print log to the device management server PC 101 and the print log collection unit 303 may store the information received via the print management communication unit 306 in the print log storage unit 312.

Next, the printer driver management application 351 is described in detail below. The printer driver management application 351 includes a printer driver management master control unit 352 that is operable as a main processing unit of the printer driver management application 351. The printer driver management master control unit 352 is configured to control operations to be performed by other processing units 353 to 357.

The print setting management unit 353 is configured to manage default print settings of a printer driver that can operate each MFP device connected to the network 104. The print setting management unit 353 is configured to change the information stored in the print setting storage unit 361 in response to a request to customize the default print settings of the printer driver that can operate a specific MFP device connected to the network 104.

The installer package generation unit 354 is configured to generate an installer package to be push installed on the end user client PC 102 and transmit the generated installer package to the installer package distribution unit 355. The installer package generation unit 354 is configured to generate an installer package by combining installation target printer information and information about default print settings stored in the print setting storage unit 361 and a printer driver installer stored in an installer storage unit 363.

The installer package distribution unit 355 is configured to transmit the installer package to the end user client PC 102 via the printer driver management communication unit 356 to automatically execute the installer. In addition, the installer package distribution unit 355 is configured to store installation target printer information and information about default print settings included in the distributed installer package and information about distribution date and time, as distribution history, in the print setting distribution history storage unit 362.

The printer driver management UI generation unit 357 is configured to generate a printer driver management web UI in response to a request from the web browser of the administrator client PC 106 and transmit the generated printer driver management web UI to the web browser. The web UI is constituted by HTML and scripts that can be executed by the client PC.

A device administrator can select a printer driver that can operate a specific MFP device connected to the network 104, from the printer driver installer stored in the installer storage unit 363, via the printer driver management web UI. Information about a combination of the selected printer driver and the MFP device is stored, as installation target printer information, in the print setting storage unit 361.

Further, a device administrator can customize (change) default print settings of the printer driver allocated to a specific MFP device 103 connected to the network 104, via the printer driver management web UI. In this case, by customizing the default print settings of the printer driver, the device administrator enables an end user who uses the printer driver to prioritize 2in1 or two-sided print.

Further, the device administrator can instruct push installation of the installer package on the end user client PC 102, via the printer driver management web UI. Thus, the administrator can install a printer driver including new default print settings on the end user client PC 102 each time when the default print settings of the printer driver have been changed.

The print setting storage unit 361 is configured to store information about the printer driver that can operate each MFP device connected to the network 104 (i.e., installation target printer information) and information about default print settings of the printer driver in the external storage device (e.g., the hard disk) 210.

The print setting distribution history storage unit 362 is configured to store information about installation target printer, default print settings, and distribution date and time included in the installer package distributed to the end user client PC 102, in the external storage device (e.g., the hard disk) 210.

The installer storage unit 363 is configured to store an installer of the printer driver that can operate each MFP device connected to the network 104 in the external storage device (e.g., the hard disk) 210. In general, the printer driver installer is provided by a printer vendor of each MFP device. The printer driver installer can read installation target printer information from the installer package in performing the installation and set the installed printer driver as being available on the end user client PC 102.

Further, the printer driver installer can read information about default print settings included in the installer package in performing the installation and set the read information as default print settings of the printer driver. Once the printer driver is installed on the end user client PC 102, a print job is generated based on the print settings of the installed printer driver and a corresponding MFP device performs a printing operation according to the generated print job, unless an end user changes the print settings.

<Configuration of Print Log>

FIG. 4 is a table illustrating an example of a print log 401 stored in the print log storage unit 312.

As illustrated in FIG. 4, the print log 401 is composed of the following attributes 402 to 415. In the following description, each record data (421 to 427) registered in the print log 401 is referred to as "print log record." One print log record represents a processing record of one print job.

An identifier uniquely allocated to an individual print log record is set in the field of "print log ID" attribute 402. The print log ID is allocated to an individual print log record when the print log collection unit 303 acquires a print log from the MFP device 103 or any other printer. When the print log collection unit 303 acquires a print log from a printer (e.g., the MFP device 103), the print log collection unit 303 records an identification name allocated to the printer in the field of "printer name" attribute 403.

When the MFP device 103 receives print job data from the end user client PC 102 via the network interface 257, print job name information included in the received print job data is recorded in the field of "job name" attribute 404. In general, when an application program running on the client PC performs printing using a printer driver, the application transmits the print job name information to the printer driver. The print job name is variable depending on each application that performs printing. For example, the print job name includes at least a part of application name or print target document name. Therefore, if the same document is reprinted, the same print job name is used.

When the MFP device 103 receives print job data from the end user client PC 102 via the network interface 257, user name information included in the received print job data is set in the field of "print user" attribute 405. In general, the user name included in the print job data is an account name of a user who has instructed the application to perform printing. The user name can be set by the printer driver. In the present exemplary embodiment, the user's account name is uniquely allocated in the system illustrated in FIG. 1.

When the printer apparatus 254 of the MFP device 103 starts print job processing, information about processing start date and time is recorded in the field of "print start date and time" attribute 406. When the printer apparatus 254 of the MFP device 103 terminates the print job processing, information about processing termination date and time is recorded in the field of "print termination date and time" attribute 407.

The number of logical pages included in the print job processed by the printer apparatus 254 of the MFP device 103 is recorded in the field of "number of pages" attribute 408. The number of logical pages is the number of pages included in electronic data, which may be different from the number of actually printed physical pages (i.e., papers) because it is variable depending on page imposition setting of the printer driver. When the printer apparatus 254 of the MFP device 103 performs print job processing, the number of logical pages processed in color printing is recorded in the field of "color sum" attribute 409. Similarly, the number of logical pages processed in monochrome printing is recorded in the field of "monochrome sum" attribute 410.

When the printer apparatus 254 of the MFP device 103 performs print job processing, information about the size of paper used in the print processing is recorded in the field of "paper size" attribute 411.

When the printer apparatus 254 of the MFP device 103 performs print job processing, a numerical value (1 or 0) indicating whether to perform the two-sided print on a piece of paper is recorded in the field of "two-sided" attribute 412. More specifically, the numerical value "1" indicates that the two-sided print has been performed and the numerical value "0" indicates that the two-sided print has not been performed. In general, the two-sided print is performed based on a setting value of the print job according to the settings of the printer driver.

When the printer apparatus 254 of the MFP device 103 performs print job processing, a numerical value (1 or 0) indicating whether to impose two logical pages per physical page in performing printing is recorded in the field of "2 in1" attribute 413. Similarly, a numerical value (1 or 0) indicating whether to impose four or more logical pages per physical page in performing printing is recorded in the field of "4in1 or more" attribute 414. In general, the "2in1" or "4in1 or more" imposition (i.e., aggregative print) is performed based on a setting value of the print job according to the settings of the printer driver.

When the printer apparatus 254 of the MFP device 103 performs print job processing at least partly, the number of sheets (i.e., required papers) and the number of printed copies are recorded in the field of "number of sheets×number of copies" attribute 415. The total number of sheets (i.e., papers) actually used for the print job can be calculated by multiplying the number of sheets (i.e., papers) with the number of printed copies.

<Print Log Analysis Based Reprint Determination Counting Result Display>

Figure 5:
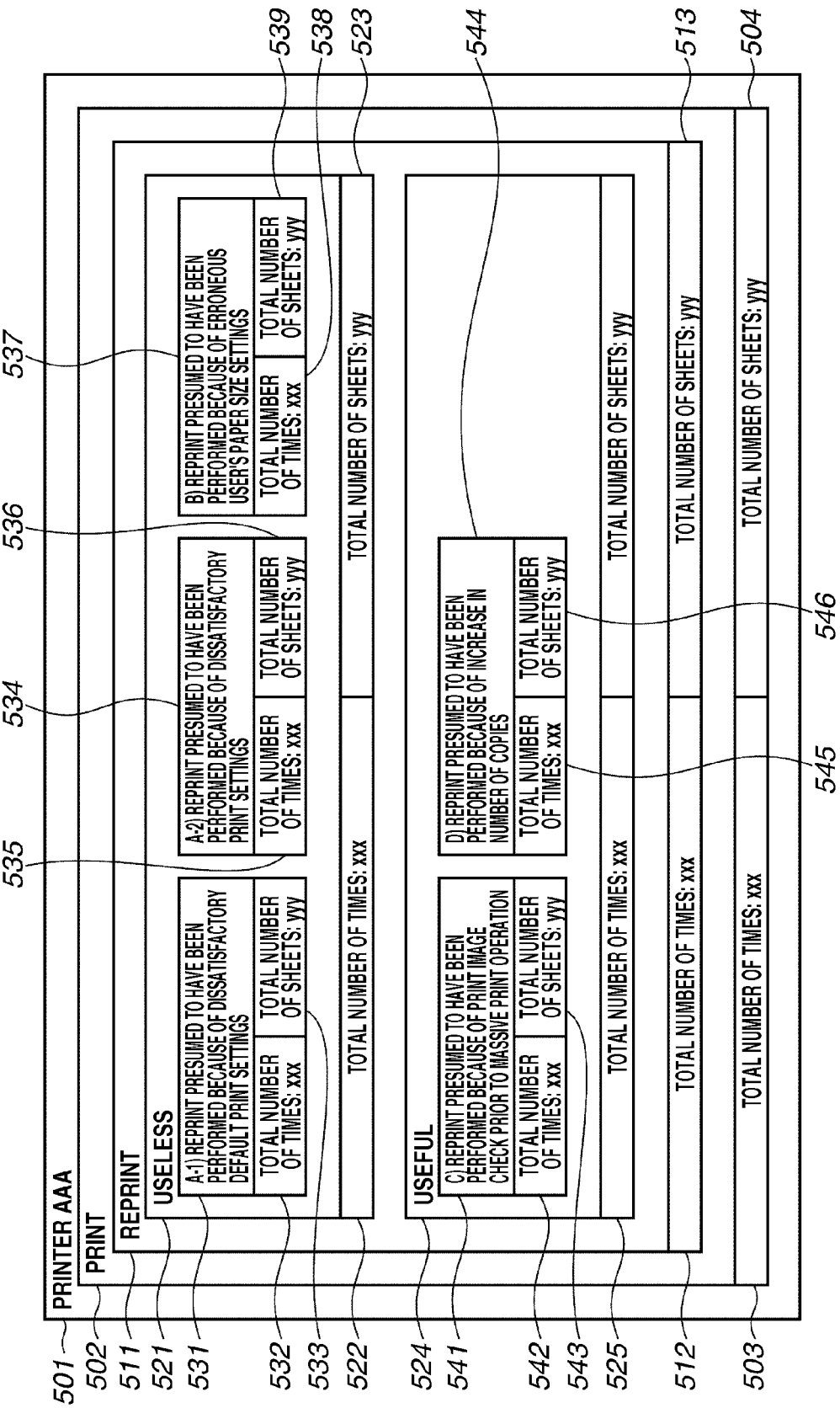
FIG. 5 illustrates an example display of print/reprint counting results.

FIG. 5 illustrates an example display of counting results with respect to reprint operations determined based on the above-mentioned print log 401 (i.e., processing target) according to a print log analysis based reprint determination and counting method described below. The display pattern illustrated in FIG. 5 is an individual display for each printer.

When the print management web UI of the device management application 301 performs a print tendency analysis and counting display function, the print job analysis and counting result display illustrated in FIG. 5 can be displayed as a part of the print management web UI in the window of the web browser.

The display example illustrated in FIG. 5 includes a display area 501 for the counting result of each printer. A label (i.e., "printer AAA") attached to the display area 501 is a printer name of the MFP device 103 that is one of counting targets. The printer name coincides with one of the values stored in the field of "printer name" attribute 403 of the print log 401. The display pattern is not limited to the individual display for each printer, as illustrated in FIG. 5. For example, another appropriate name (e.g., "all printers") is usable as the label for the display area 501 in a case where counting results of all counting target printers are displayed. Further, the display area 501 can include a display area for the analysis target period of time of the print log 401 having been analyzed.

The display example illustrated in FIG. 5 includes a display area 502 that indicates a counting result of printing operations performed by the MFP device 103 (i.e., a counting result display target printer). The display area 502 includes a "total number of times" display area 503 and a "total number of sheets" display area 504. The display area 501 can include additional display areas dedicated to counting results of a copy job and a scan job, in addition to the display area 502.

The value to be displayed in the "total number of times" display area 503 is a numerical value indicating the total number of print operations performed by the MFP device 103 (i.e., the counting result display target printer). The numerical value displayed in the "total number of times" display area 503 (i.e., the total number of print operations) is identical to the total number of print log records that include the name of the counting result display target printer in the "printer name" attribute 403 field of the print log 401. More specifically, the numerical value indicating the total number of print operations coincides with the number of print jobs processed by the above-mentioned printer during a counting period of time.

The value to be displayed in the "total number of sheets" display area 504 is a numerical value indicating the total number of sheets printed by the counting result display target printer. The numerical value displayed in the "total number of sheets" display area 504 (i.e., the total number of printed sheets) is identical to a value obtained by adding multiplied values in the "number of sheets×number of copies" attribute 415 field of print log records that include the name of the counting result display target printer in the "printer name" attribute 403 field of the print log 401. More specifically, the numerical value indicating the total number of printed sheets coincides with the total number of sheets (i.e., papers) consumed by the above-mentioned printer during the counting period of time.

The display example illustrated in FIG. 5 includes a display area 511 that displays a counting result of reprint operations performed by the MFP device 103. The display area 511 includes a "total number of times" display area 512 and a "total number of sheets" display area 513. The value to be displayed in the "total number of times" display area 512 is a numerical value indicating the total number of reprint operations performed by the MFP device 103 (i.e., the counting result display target printer). The numerical value displayed in the "total number of times" display area 512 (i.e., the total number of reprint operations) coincides with the number of print jobs subjected to reprint that can be identified based on print log records including the name of the counting result display target printer in the "printer name" attribute 403 field of the print log 401. The value to be displayed in the "total number of sheets" display area 513 is a numerical value indicating the total number of sheets used in the reprinting operations performed by the counting result display target printer. The numerical value displayed in the "total number of sheets" display area 513 (i.e., the total number of sheets used in reprinting operations) coincides with a value obtained by adding multiplied values in the "number of sheets×number of copies" attribute 415 field of print log records of the print jobs determined as having been subjected to the reprint. More specifically, the value displayed in the "total number of sheets" display area 513 can be regarded as the total number of sheets (i.e., papers) consumed in the reprinting operations performed by the above-mentioned printer during the counting period of time.

Further, the reprint counting result display area 511 includes display area 521 and 524. The display area 521 displays a counting result of reprint operations determined as being useless. The display area 524 displays a counting result of reprint operations determined as being useful. The display area 521 includes a "total number of times" display area 522 and a "total number of sheets" display area 523. The display area 524 includes a "total number of times" display area 525 and a "total number of sheets" display area 526.

The value to be displayed in each of the "total number of times" display areas 522 and 525 is a numerical value indicating the total number of reprint operations determined as being useless or useful, of the reprint operations performed by the MFP device 103 (i.e., counting result display target printer). The value to be displayed in each of the "total number of sheets" display areas 523 and 526 is a numerical value indicating the total number of sheets (i.e., papers) consumed in the reprint operations determined as being useless or useful. The numerical values displayed in the "total number of sheets" display areas 523 and 526 coincide with values obtained by adding multiplied values in the "number of sheets×number of copies" attribute 415 field of print log records of the print jobs determined as being useless or useful reprint.

Further, the useless reprint counting result display area 521 includes display areas 531 to 539. The useful reprint counting result display area 524 includes display areas 541 to 546.

Three display areas 531, 534, and 537 are provided to display counting results of categorized reprint operations estimated as being useless. More specifically, the display area 531 is dedicated to display a counting result of reprint operations classified into a category of useless "A-1) reprint presumed to have been performed because of dissatisfactory default print settings". The display area 534 is dedicated to display a counting result of reprint operations classified into a category of useless "A-2) reprint presumed to have been performed because of dissatisfactory print settings". The display area 537 is dedicated to display a counting result of reprint operations classified into a category of useless "B) reprint presumed to have been performed because of erroneous user's paper size settings".

The display area 531 includes a "total number of times" display area 532 and a "total number of sheets" display area 533. The display area 534 includes a "total number of times" display area 535 and a "total number of sheets" display area 536. The display area and 537 includes a "total number of times" display area 538 and a "total number of sheets" display area 539. The value to be displayed in each of the "total number of times" display areas 532, 535, and 538 is a numerical value indicating the total number of useless reprint operations belonging to each category. The value to be displayed in each of the "total number of sheets" display areas 533, 536, and 539 is a numerical value indicating the total number of sheets (i.e., papers) consumed in the useless reprint operations belonging to each category. The numerical values displayed in the "total number of sheets" display areas 533, 536, and 539 coincide with values obtained by adding multiplied values in the "number of sheets×number of copies" attribute 415 field of print log records of the print jobs determined as being useless reprint for respective categories.

Two display areas 541 and 544 are provided to display counting results of categorized reprint operations estimated as being useful. More specifically, the display area 541 is dedicated to display a counting result of reprint operations classified into a category of useful "C) reprint presumed to have been performed because of print image check prior to massive print operation". The display area 544 is dedicated to display a counting result of reprint operations classified into a category of useful "D) reprint presumed to have been performed because of an increase in the number of copies". The display area 541 includes a "total number of times" display area 542 and a "total number of sheets" display area 543. The display area 544 includes a "total number of times" display area 545 and a "total number of sheets" display area 546. The value to be displayed in each of the "total number of times" display areas 542 and 545 is a numerical value indicating the total number of useful reprint operations belonging to each category. The value to be displayed in each of the "total number of sheets" display areas 543 and 546 is a numerical value indicating the total number of sheets (i.e., papers) consumed in the useful reprint operations belonging to each category. The numerical values displayed in the "total number of sheets" display areas 543 and 546 coincide with values obtained by adding multiplied values in the "number of sheets×number of copies" attribute 415 field of print log records of the print jobs determined as being useful reprint for respective categories.

The above-mentioned example illustrated in FIG. 5 is an individual display for each printer. However, it is feasible to perform a user ranking display for each category. More specifically, for each of the above-mentioned reprint categories A-1) to D), it is feasible to perform the ranking display for each user in the order of largeness with respect to the total number of print operations or the total number of printed sheets counted based on the values stored in the "print user" attribute 405 field of the print log 401.

<Print Log Analysis Based Reprint Determination and Counting Result Display>

Hereinafter, an example method for determining reprint jobs with reference to the print log 401 and determining useless or useful reprint job categories to realize the display of reprint counting results illustrated in FIG. 5 is described below.

To perform a reprint result counting display function using the print management web UI (see FIG. 7) of the device management application 301, a user (e.g., an administrator) designates an analysis target printer and an analysis target period of time.

Figure 7:
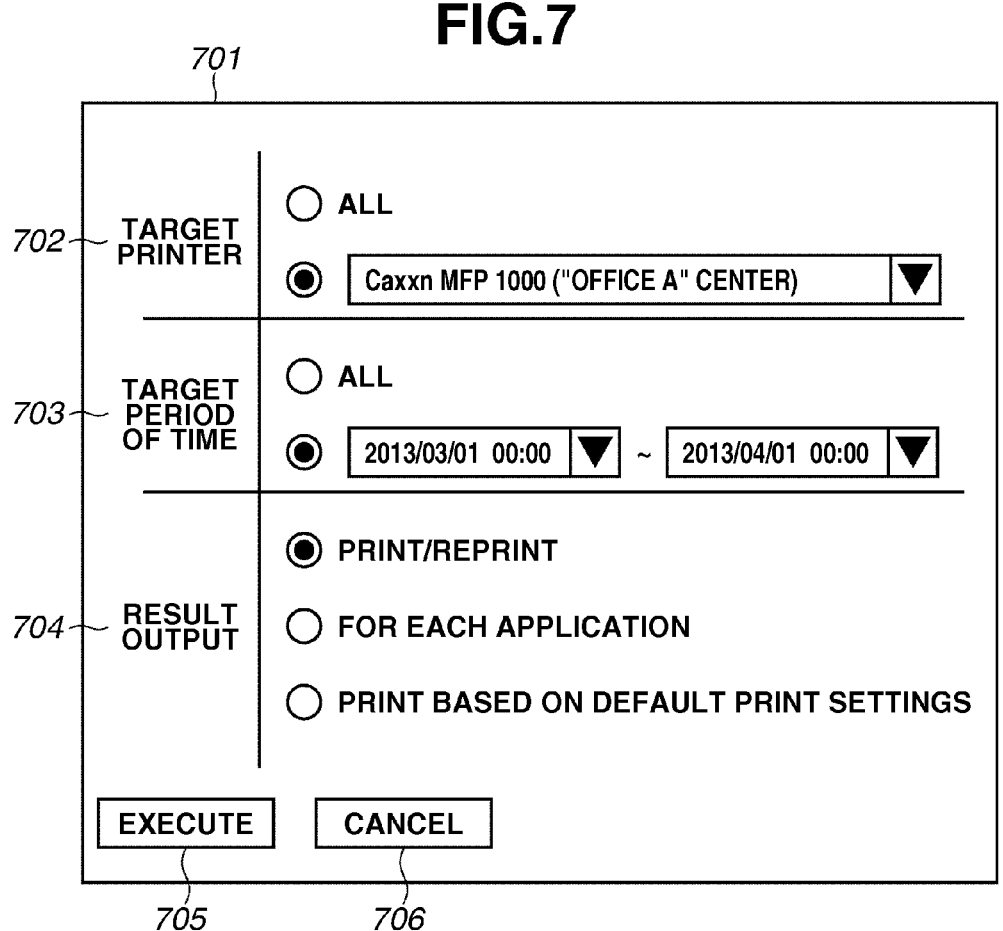
FIG. 7 illustrates a counting display function UI image of a print management web UI.

FIG. 7 illustrates an example of a count display function UI image of the print management web UI. The device management application 301 can generate the print management web UI in response to a request from the web browser of the administrator client PC 106. The web browser can display the print management web UI generated by the device management application 301.

In FIG. 7, a count display function UI 701 includes setting items 702 to 704 and buttons 705 and 706. The analysis target printer setting item 702 is operable to select all printers as analysis targets if print logs have been already acquired from these printers or designate an individual printer to be analyzed. The analysis target period setting item 703 is operable to designate an analysis target period of time to check the use tendency. For example, it is feasible to perform the analysis for each of all time periods if print logs have been already acquired in these time periods or designate a specific period of time to be analyzed. The analysis result output setting item 704 is operable to select a use tendency counting result to be output from the print log. If an option selected in the setting item 704 field is "print/reprint", the device management application 301 analyzes the job log and detects reprinted jobs. The device management application 301 determines whether each detected reprinted job is useless or useful, and outputs a determination result as described in detail below with reference to the flowchart illustrated in FIG. 6. Further, if an option selected in the setting item 704 field is "for each application", the device management application 301 analyzes the job log and detects jobs relating to each application. The device management application 301 calculates a print ratio for each application and outputs a calculation result. Further, if an option selected in the setting item 704 field is "print based on default print settings", the device management application 301 analyzes the job log and detects a job printed based on any print setting changed from the default print settings. The device management application 301 calculates a ratio of jobs printed based on changed default print settings to jobs printed based on the default print settings and outputs a calculation result (as described in detail below in the second exemplary embodiment (see FIG. 9)).

When the execution button 705 is pressed, an analysis start request (i.e., a count display request) is transmitted to the device management application 301. In response to the request, the device management application 301 starts analysis processing. After the analysis processing is completed, the web browser displays a counting result as illustrated in FIG. 5. When the cancel button 706 is pressed, the counting display function is interrupted and the count display function UI is closed.

Processing relating to print log analysis, reprint job determination, and counting result display that can be performed by the device management application 301 is described in detail below with reference to FIG. 6.

Figure 6:
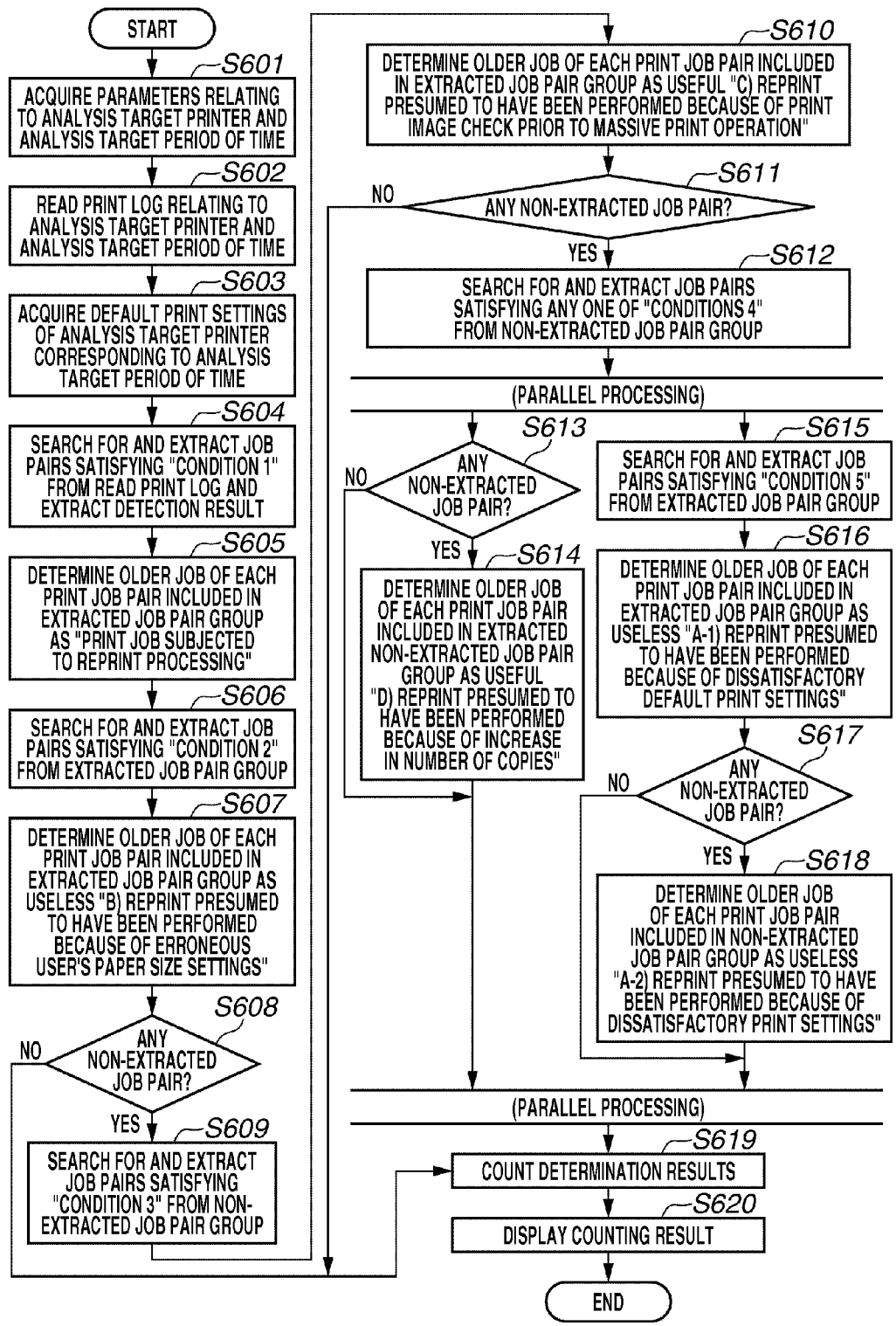
FIG. 6 is a flowchart illustrating an example of processing that can be performed by a device management application according to a first exemplary embodiment.

FIG. 6 is a flowchart illustrating an example of the processing relating to print log analysis, reprint job determination, and counting result display that can be performed by the device management application 301. In this case, it is presumed that an individual printer is designated as the analysis target printer selection setting item 702 and "print/reprint" analysis designation is selected as the analysis result output setting item 704 on the count display function UI 701. To realize the processing illustrated in FIG. 6, the CPU 201 of the device management server 101 executes a computer-readable program loaded from the external storage device 210.

If the execution button 705 is pressed on the count display function UI 701, the print management master control unit 302 of the device management application 301 receives a count display request from the web browser of the administrator client PC 106. If the received count display request is a "print/reprint counting result output request", the print management master control unit 302 executes processing according to the flowchart illustrated in FIG. 6.

First, in step S601, the print management master control unit 302 acquires an analysis target printer name and an analysis target period of time designated via the count display function UI 701, from the count display request, and transmits the acquired information, as parameters, to the print log analysis unit 304. Further, the print management master control unit 302 instructs the print log analysis unit 304 to output a "print/reprint" analysis result.

In step S602, in response to the "print/reprint" analysis result output instruction received from the print management master control unit 302, the print log analysis unit 304 reads a print log relating to the analysis target printer name and the analysis target period of time designated by the parameters from the print log 401 stored in the print log storage unit 312. More specifically, the print log to be read by the print log analysis unit 304 in this case includes the analysis target printer name designated by the parameter as a value stored in the field of "printer name" attribute 403 and further includes the analysis target period of time designated by the parameter as a value stored in the field of "print termination date and time" attribute 407 in the print log 401.

Next, in step S603, the print log analysis unit 304 acquires default print settings of a printer driver allocated to the analysis target printer name, which correspond to the analysis target period of time, from the printer driver management application 351. More specifically, if the default print settings of the printer driver allocated to the analysis target printer name have changed at least one time during the analysis target period of time (if a plurality of types is present due to a change having occurred in the default print settings during the designated analysis target period of time), the print log analysis unit 304 acquires history information about default print settings including any change having occurred (more specifically, acquires default print settings in each period of time during which the print settings have been changed).

More specifically, the print log analysis unit 304 transmits a history data acquiring request about the default print settings of the printer driver allocated to the analysis target printer to the printer driver management master control unit 352 of the printer driver management application 351 via the print management communication unit 306. The printer driver management master control unit 352 instructs the print setting management unit 353 to acquire the requested information about history of the default print settings. The print setting management unit 353 acquires the history information about the default print settings of the printer driver allocated to the analysis target printer instructed by the printer driver management master control unit 352 from the print setting distribution history storage unit 362. The print setting management unit 353 acquires the requested history information about the default print settings from the history of installation target printer information, default print settings information, and distribution date and time information, which are stored in the print setting distribution history storage unit 362. In this case, the print setting management unit 353 designates the distribution date and time information about the printer driver as change date and time information about the default print settings of the printer driver. The print setting management unit 353 transmits the acquired history information about the default print settings of the printer driver allocated to the analysis target printer to the request source (i.e., the print log analysis unit 304 of the device management application 301) via the printer driver management communication unit 356. More specifically, the history information transmitted in this case includes one or more default print settings and change date and time information about each of two or more default print settings. The print log analysis unit 304 analyzes the print log and identifies reprinted jobs.

Next, in step S604, the print log analysis unit 304 searches for print job pairs satisfying all of the following three conditions of <condition 1> from the print log 401 read in step S602 and extracts a detection result.

<Condition 1>
Identical in the value stored in the field of "job name" attribute 404
Identical in the value stored in the field of "print user" attribute 405
Identical in the value stored in the field of "number of pages" attribute 408

In the present exemplary embodiment, the print job pair is two print log records that are similar in specific points and stored in the print log 401. The print job pair is constituted by an old print log record (i.e., an old print job) and a new print log record (i.e., a new print job), which are different in the value stored in the field of "print termination date and time" attribute 407. The similarity between two print log records in the print log 401 can be, for example, determined with reference to three conditions of the above-mentioned <condition 1>. For example, if there are three print log records each satisfying the above-mentioned three conditions, the print log analysis unit 304 extracts two print job pairs. More specifically, in a case where three print log records X, Y, and Z (in order of oldness in print log record date and time) are present, the print log analysis unit 304 extracts two print job pairs, i.e., a pair of X and Y and a pair of Y and Z if the above-mentioned three conditions are satisfied. The print job pair extracted in step S604 is, for example, a pair of print log records 421 and 423 stored in the print log 401 illustrated in FIG. 4. The print log analysis unit 304 stores the print job pair group extracted in step S604, as temporary data, in the RAM 202 or the external storage device 210. Further, if there are two print jobs that are identical in the value stored in the field of "number of pages" attribute 408 and identical in any one of the values stored in the fields of "job name" attribute 404 and "print user" attribute 405, it is feasible to extract these print jobs as a print job pair.

Figure 8:
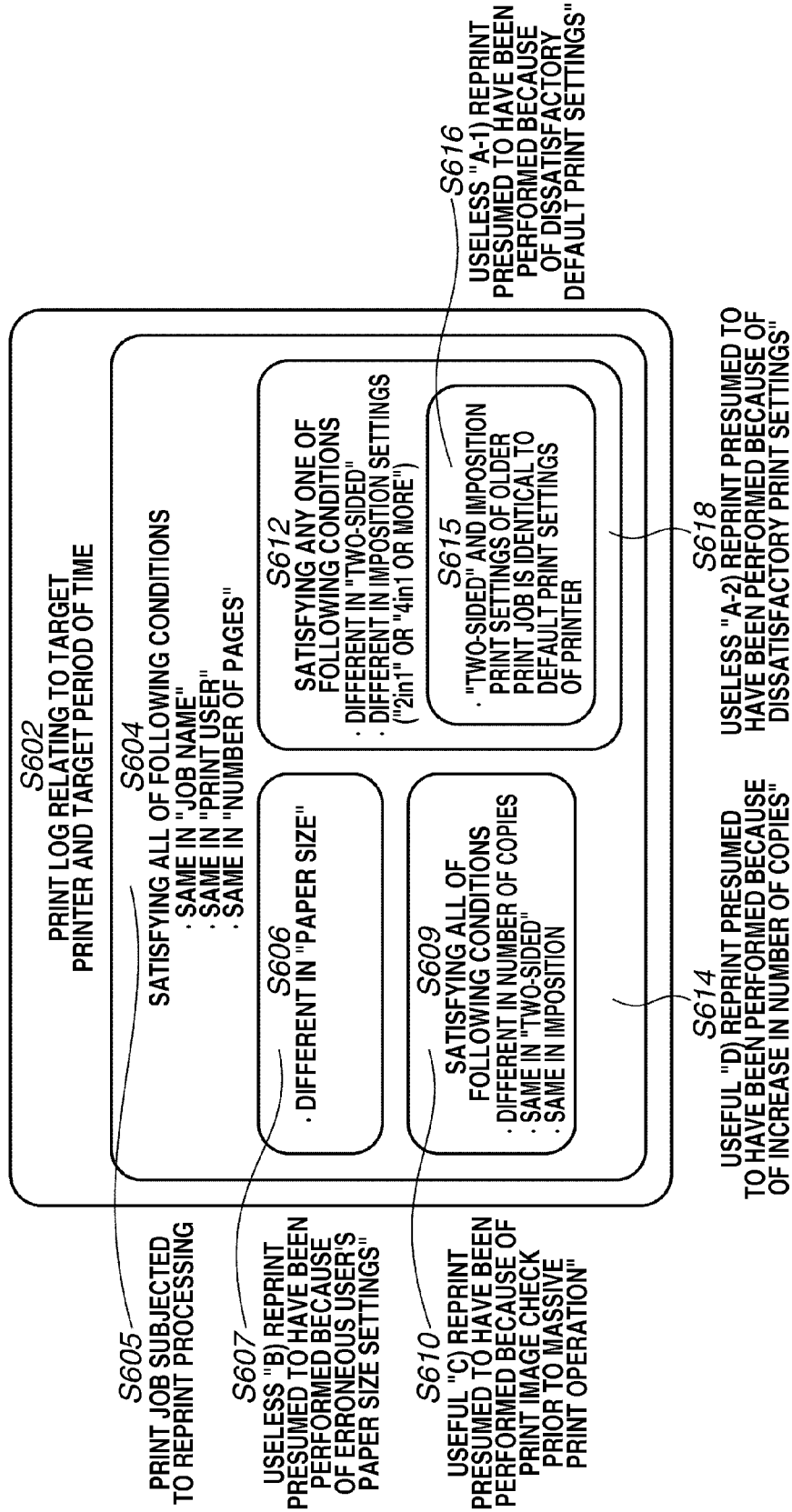
FIG. 8 illustrates an inclusion relation with respect to print log record category classification and condition.

Next, in step S605, the print log analysis unit 304 determines that an older print job of each print job pair included in the print job pair group extracted in the above-mentioned step S604 as a print job to be classified into a category corresponding to "print job subjected to reprint" as illustrated in FIG. 8. FIG. 8 illustrates an inclusion relation with respect to print log record category classification and condition. The print log analysis unit 304 stores the above-mentioned determination result in the print log analysis result storage unit 313.

Next, in step S606, the print log analysis unit 304 searches for and extracts print job pairs satisfying the following condition <condition 2> from the print job pair group extracted in step S604.

<Condition 2>
Different in the value stored in the field of "paper size" attribute 411

Next, in step S607, the print log analysis unit 304 determines that an older print job of each print job pair included in the print job pair group extracted in the above-mentioned step S606 as a print job to be classified into the category of useless "B) reprint presumed to have been performed because of erroneous user's paper size settings" (see FIG. 8). The print log analysis unit 304 stores the above-mentioned category determination result in the print log analysis result storage unit 313.

Next, in step S608, the print log analysis unit 304 confirms whether there is any print job pair not extracted in the above-mentioned step S606 and included in the above-mentioned print job pair group extracted in step S604. Then, if the print log analysis unit 304 determines that there is not any print job pair that has not been extracted in the above-mentioned step S606 and is included in the print job pair group extracted in the above-mentioned step S604 (No in step S608), the operation directly proceeds to step S619.

On the other hand, if the print log analysis unit 304 determines that there is at least one print job pair not extracted in the above-mentioned step S606 and included in the print job pair group extracted in the above-mentioned step S604 (Yes in step S608), the operation proceeds to step S609.

In step S609, the print log analysis unit 304 searches for and extracts print job pairs satisfying the following condition <condition 3> from the print job pair group having been extracted in the above-mentioned step S604 and not extracted in the above-mentioned step S606.

<Condition 3>
  Different in the number of copies stored in the field of "number of sheets×number of copies" attribute 415
  Identical in the value stored in the field of "two-sided" attribute 412 (more specifically, identical in the "two-sided setting" value)
  Identical in the values stored in the fields of "2in1" attribute 413 and "4in1 or more" attribute 414 (more specifically, identical in the "imposition setting" value)

Next, in step S610, the print log analysis unit 304 determines that an older print job of each print job pair of the print job pair group extracted in the above-mentioned step S609 as a print job to be classified into the category of useful "C) reprint presumed to have been performed because of print image check prior to massive print operation" (see FIG. 8). The print log analysis unit 304 stores the above-mentioned category determination result in the print log analysis result storage unit 313.

Next, in step S611, the print log analysis unit 304 confirms whether there is any print job pair not extracted in the above-mentioned steps S606 and S609 are included in the above-mentioned print job pair group extracted in step S604. Then, if the print log analysis unit 304 determines that there is not any print job pair that has not been extracted in the above-mentioned steps S606 and S609 and is not included in the above-mentioned print job pair group extracted in step S604 (No in step S611), the operation directly proceeds to step S619.

On the other hand, if it is determined that there is at least one print job pair that has not been extracted in the above-mentioned steps S606 and S609 and is included in the print job pair group extracted in step S604 (Yes in step S611), the print log analysis unit 304 executes processing in step S612.

In step S612, the print log analysis unit 304 searches for and extracts print job pairs satisfying any one of the following conditions <condition 4> from the print job pair group extracted in the above-mentioned step S604 and not extracted in the above-mentioned steps S606 and S609.
<Condition 4>
  Different in the value stored in the field of "two-sided" attribute 412 (more specifically, different in the "two-sided setting" value)
  Different in the value stored in the field of "2in1" attribute 413 or "4 in1 or more" attribute 414 (more specifically, different in the "imposition setting" value)

After completing the above-mentioned step S612, the print log analysis unit 304 performs two pieces of parallel processing in steps S613 to S614 and in steps S615 to S618.
<Parallel Processing 1>
In step S613, the print log analysis unit 304 confirms whether there is any print job pair that has not been extracted in the above-mentioned steps S606, S609, and S612 and is included in the print job pair group extracted in the above-mentioned step S604. Then, if it is determined that there is not any print job pair that has not been extracted in the above-mentioned steps S606, S609, and S612 and is not included in the above-mentioned print job pair group extracted in step S604 (No in step S613), the print log analysis unit 304 skips step S614 and terminates the parallel processing 1.

On the other hand, if the print log analysis unit 304 determines that there is at least one print job pair that has not been extracted in the above-mentioned steps S606, S609, and S612 and is included in the above-mentioned print job pair group extracted in step S604 (Yes in step S613), the operation proceeds to step S614.

In step S614, the print log analysis unit 304 determines that an older print job of each print job pair having been extracted in the above-mentioned step S604 and not extracted in the above-mentioned steps S606, S609, and S612 as a print job to be classified into the category of useful "D) reprint presumed to have been performed because of an increase in the number of copies" (see FIG. 8). The print log analysis unit 304 stores the above-mentioned category determination result in the print log analysis result storage unit 313 and terminates the parallel processing 1.
<Parallel processing 2>
In step S615, the print log analysis unit 304 searches for and extracts print job pairs satisfying the following condition <condition 5> from the print job pair group extracted in the above-mentioned step S612.
<Condition 5>
  Setting values in the fields of "two-sided" attribute 412, "2in1" attribute 413, and "4in1 or more" attribute 414 of an old print job of the print job pair are identical to the default print settings of the printer driver In the processing to be performed in the above-mentioned step S615, the print log analysis unit 304 searches for and extracts print job pairs satisfying the condition <condition 5> with reference to history information about the default print settings of the printer driver allocated to the analysis target printer name acquired in the above-mentioned step S603 during the analysis target period of time. In this case, the print log analysis unit 304 compares information about change date and time of default print settings of the printer driver with date and time information stored in the field of "print termination date and time" attribute 407 of an old print job, and selects the default print settings of the printer driver at the "print termination date and time" of the old print job from the history information acquired in the above-mentioned step S603. More specifically, if the relationship [the date and time information stored in the field of "print termination date and time" attribute 407 of the old print job]≥[the change date and time of default print settings of the printer driver] is satisfied, the print log analysis unit 304 selects default print settings of the printer driver including the above-mentioned change date and time. In the search and extraction, the print log analysis unit 304 determines whether setting values in the fields of "two-sided" attribute 412, "2in1" attribute 413, and "4in1 or more" attribute 414 of the selected default print settings of the printer driver coincide with setting values in the fields of "two-sided" attribute 412, "2in1" attribute 413, and "4in1 or more" attribute 414 of the old print job of the print job pair.

Next, in step S616, the print log analysis unit 304 determines that an older print job of each print job pair included in the print job pair group extracted in the above-mentioned step S615 as a print job to be classified into the category of useless "A-1) reprint presumed to have been performed because of dissatisfactory default print settings" (see FIG. 8). The print log analysis unit 304 stores the above-mentioned category determination result in the print log analysis result storage unit 313.

Next, in step S617, the print log analysis unit 304 confirms whether there is any print job pair that has not been extracted in the above-mentioned step S615 and is included in print job pair group extracted in the above-mentioned step S612. Then, if it is determined that there is not any print job pair that has not been extracted in the above-mentioned step S615 and is not included in the print job pair group extracted in the above-mentioned step S612 (No in step S617), the print log analysis unit 304 terminates the parallel processing 2.

On the other hand, if the print log analysis unit 304 determines that there is at least one print job pair that has not been extracted in the above-mentioned step S615 and is included in the print job pair group extracted in the above-mentioned step S612 (Yes in step S617), the operation proceeds to step S618. In step S618, the print log analysis unit 304 determines that an older print job of each print job pair included in the print job pair group having been extracted in the above-mentioned step S612 and not extracted in the above-mentioned step S615 as a print job to be classified into the category of useless "A-2) reprint presumed to have been performed because of dissatisfactory print settings"-(see FIG. 8). The print log analysis unit 304 stores the above-mentioned category determination result in the print log analysis result storage unit 313 and terminates the parallel processing 2.

When the print log analysis unit 304 completes the above-mentioned parallel processing 1 (step S613 to step S614) and the above-mentioned parallel processing 2 (step S615 to step S618), the operation proceeds to step S619.

In step S619, the print log analysis unit 304 counts the "print job subjected to reprint" and print log records of respective categories A-1) to D), which have been obtained in the above-mentioned determination steps S605, S607, S610, S614, S616, and S618, which are stored in the print log analysis result storage unit 313. In the counting, the print log analysis unit 304 calculates the total number of print log records that correspond to respective determination results, and calculates the total number of printed sheets that can be obtained by adding multiplied values in the "number of sheets×number of copies" attribute 415 field of the print log records. The print log analysis unit 304 performs the above-mentioned calculations for each of the determination results obtained in steps S605, S607, S610, S614, S616, and S618.

After completing the processing in step S619, the print log analysis unit 304 instructs the print log analysis result report generation unit 305 to display a counting result and terminates the processing.

Next, in step S620, in response to the counting result display instruction received from the print log analysis unit 304, the print log analysis result report generation unit 305 generates display data as illustrated in FIG. 5 based on the counting result data stored in the print log analysis result storage unit 313. Further, the print log analysis result report generation unit 305 transmits the generated display data to the web browser of the administrator client PC 106 via the print management communication unit 306, and terminates the processing of the flowchart illustrated in FIG. 6. The web browser of the administrator client PC 106 displays the above-mentioned display data received from the print log analysis result report generation unit 305 of the device management application 301 on the print management web UI (see FIG. 5).

In the above-mentioned processing, the display of the counting results is performed without any division even when the default print settings of the printer driver have been changed during the designated analysis target period of time (i.e., during the designated counting target period of time). In such a case, it is useful to display counting results divided according to a change of the default print settings.

For example, in a case where the default print settings of the printer driver have been changed once during the counting target period of time, the print log analysis result report generation unit 305 generates two pieces of display data for the analysis and counting results illustrated in FIG. 5 so that two results can be displayed on the print management web UI by the web browser of the administrator client PC 106. The device administrator can confirm a change having occurred before and after the change in the default print settings of the printer driver, based on a comparison between two displayed results. Performing the above-mentioned confirmation is useful for the device administrator to exactly check the cost reduction effects obtained by the change in the default print settings of the printer driver.

To realize the TCO reduction, the device administrator may designate monochrome print as a part of the default print settings of the printer driver. Therefore, in the above-mentioned example, it is useful that the processing to be performed in steps S609, S612, and S615 includes an additional determination condition to check the similarity with respect to the print setting value indicating the presence of any page having been subjected to the color processing (referring to the values stored in the fields of "color sum" attribute 409 and "monochrome sum" attribute 410).

As described above, the device management application 301 according to the present exemplary embodiment identifies each reprinted print job with reference to a print log, classifies the identified reprinted print job into a category of usefully reprinted print jobs or a category of uselessly reprinted print jobs, counts the number of reprinted print jobs for each classified category, and displays counting results. It is feasible for the device administrator to be aware of a numerical value indicating reprint operations, or useless print operations, performed in an office by comparing the counting result classified into each category with the counting result of the entire print jobs. Further, the device administrator can enhance the reprint cost reduction effects based on the confirmed numerical value. As mentioned above, according to the present exemplary embodiment, it is feasible to visualize useless document reprint operations and assist cost reduction activities to be performed by the device administrator.

As mentioned above, the system according to the present exemplary embodiment can visualize the reprint of the same document performed because of dissatisfactory print settings determined beforehand by the device administrator. The device administrator can easily recognize the amount of useless reprint operations performed in an office.

According to the above-mentioned first exemplary embodiment, a print log is analyzed based on default print settings having been set by a device administrator, a reprint presumed to have been performed because of a dissatisfactory print result is identified based on the default print settings, and a determined result is output. Therefore, it is feasible to visualize a change (i.e., increase/reduction) in the number of reprints that has occurred because the device administrator has changed the default print settings. Further, the device administrator can reevaluate the default print settings of the printer driver based on the visualized result or can approach to a user for the purpose of caution or education.

However, users are different depending on a place where a printer is installed. The use tendency is possibly variable depending on the users. It is usual that the device administrator does not customize default print settings of a printer driver allocated to each printer, because of no reason. To solve the above-mentioned problem, the system according to a second exemplary embodiment has the following configuration. Hereinafter, only a portion different from the configuration described in the first exemplary embodiment and a new configuration are described below.

FIG. 9 is a flowchart illustrating an example of processing relating to print log analysis, default print settings based print determination, and counting result display that can be performed by the device management application 301. In this case, it is presumed that an individual printer (e.g., Caxxn MFP 100 ("office A" center)) is designation as the analysis target printer selection setting item 702 and "print based on default print settings" analysis designation is selected as the analysis result output setting item 704 on the count display function UI 701 illustrated in FIG. 7. To realize the processing illustrated in FIG. 9, the CPU 201 of the device management server 101 executes a computer-readable program that can be loaded from the external storage device 210.

If the execution button 705 (see FIG. 7) is pressed on the count display function UI 701, the print management master control unit 302 of the device management application 301 receives a count display request from the web browser of the administrator client PC 106. If the received count display request is a "print based on default print settings" counting result output request, the print management master control unit 302 executes processing according to the flowchart illustrated in FIG. 9.

In FIG. 9, processing to be performed in steps S901 and S902 is similar to the processing performed in steps S601 and S602 illustrated in FIG. 6, except that the instructed analysis result output is "print based on default print settings" (not "print/reprint"). Therefore, redundant description thereof will be avoided. Further, processing to be performed in step S903 is similar to the processing performed in step S603 illustrated in FIG. 6, and therefore redundant description thereof will be avoided.

Next, in step S904, the print log analysis unit 304 searches for and extracts print log records of print jobs satisfying the following condition <condition 6> from the print log 401 read in step S902.

<Condition 6>

Setting values in the fields of "two-sided" attribute 412, "2in1" attribute 413, and "4in1 or more" attribute 414 are identical to the default print settings of the printer driver The print log analysis unit 304 extracts print job pairs while checking if the condition <condition 6> is satisfied with reference to information about history of the default print settings of the printer driver allocated to the analysis target printer name acquired in step S903, during the analysis target period of time. The print log analysis unit 304 stores the extracted print log records, as temporary data, in the RAM 202 or the external storage device 210.

Next, in step S905, the print log analysis unit 304 calculates the total number of print log records extracted in the above-mentioned step S904, and calculates the total number of printed sheets with reference to the value stored in the field of "number of sheets×number of copies" attribute 415 of each print log record, i.e., a sum of addition results of multiplied values.

Next, in step S906, the print log analysis unit 304 calculates a ratio of the total number of print log records and the total number of printed sheets for the print job calculated in the above-mentioned step S905 to the total number of print log records and the total number of printed sheets of the print log 401 read in the above-mentioned step S902. The print log analysis unit 304 stores the above-mentioned calculation result in the print log analysis result storage unit 313.

Next, in step S907, the print log analysis unit 304 confirms whether the default print settings of the printer driver have been changed at least one time during the analysis target period of time, with reference to the information about history of the default print settings acquired in the above-mentioned step S903.

Next, in step S908, the print log analysis unit 304 determines whether the default print settings of the printer driver have been changed at least one time during the analysis target period of time, based on the confirmation result obtained in the above-mentioned step S907. Then, if it is determined that the default print settings of the printer driver have not changed during the analysis target period of time (No in step S908), the print log analysis unit 304 instructs the print log analysis result report generation unit 305 to display a counting result, and terminates the processing of the flowchart illustrated in FIG. 9. In response to the instruction from the print log analysis unit 304, the print log analysis result report generation unit 305 performs display processing in step S911 as described in detail below.

On the other hand, if the print log analysis unit 304 determines that the default print settings of the printer driver have been changed at least one time during the analysis target period of time (Yes in step S908), the operation proceeds to step S909.

In step S909, the print log analysis unit 304 executes the counting processing described in the above-mentioned step S905 for each period of time in which the default print settings of the printer driver have been changed. Next, in step S910, the print log analysis unit 304 executes the calculation processing described in the above-mentioned step S906 for each period of time in which the default print settings of the printer driver have been changed. Similar to step S906, the print log analysis unit 304 stores the calculation result in the print log analysis result storage unit 313.

After completing the processing in the above-mentioned step S910, the print log analysis unit 304 instructs the print log analysis result report generation unit 305 to display a counting result, and terminates the processing. In response to the request from the print log analysis unit 304, the print log analysis result report generation unit 305 performs the display processing in step S911.

In step S911, in response to the counting result display instruction received from the print log analysis unit 304, the print log analysis result report generation unit 305 generates display data based on the counting result data stored in the print log analysis result storage unit 313. The print log analysis result report generation unit 305 transmits the generated display data to the web browser of the administrator client PC 106 via the print management communication unit 306, and terminates the processing of the flowchart illustrated in FIG. 9. The web browser of the administrator client PC 106 displays the display data received from the print log analysis result report generation unit 305 of the device management application 301 on the print management web UI.

As described above, according to the second exemplary embodiment, it is feasible for each printer to count a ratio (i.e., a rate) of the prints performed by an end user based on print settings different from the default print settings. Therefore, the device administrator can determine whether the default print settings are suitable for the printer setup place/user group based on a comparison with the counting result of another printer. The device administrator can reevaluate the default print settings of the printer driver for each printer based on the determination result.

Further, according to the second exemplary embodiment, it is feasible to determine a ratio of print jobs printed based on the default print settings of the printer driver for each period of time in which the default print settings of the printer driver have been changed. Therefore, after changing the default print settings based on reevaluation, the device administrator can confirm the effect of the changed settings based on numerical data. Accordingly, it is feasible to visualize a change in utilization rate of the default print settings that may occur when the default print settings have been changed, and it is feasible to visualize the effect of default print settings reevaluated by the device administrator.

If a user has changed the print settings to perform printing because of dissatisfactory setting contents having been set by the device administrator, it is feasible to visualize such a changed situation. The device administrator can easily recognize the utilization status of the default settings and can reevaluate the default print settings.

In the above-mentioned first exemplary embodiment, the processing of the device management application 301 has been performed when the option selected in the setting item 704 field is "print/reprint" and the execution button 705 (see FIG. 7) is pressed on the count display function UI 701. In the above-mentioned second exemplary embodiment, the processing of the device management application 301 has been performed when the option selected in the setting item 704 field is "default print settings" and the execution button 705 (see FIG. 7) is pressed. In a case where the option selected in the setting item 704 field of the count display function UI 701 is "for each application" and the execution button 705 (see FIG. 7) is pressed, the device management application 301 analyzes a job log and detects jobs for each application. Further, the device management application 301 calculates a print ratio for each application and outputs calculated results, although not described in detail.

It is feasible to combine at least two of a plurality of pieces of processing to be performed in response to selections of the option "print/reprint", the option "default print settings", and the option "for each application."

For example, it is feasible to perform calculations with respect to the reprint operations (e.g., rate, total number of times, and total number of sheets) after acquiring the ratio of print operations performed based on changed default print settings to print operations performed based on default print settings and output calculated results. Further, it is feasible to calculate a print ratio for each application after acquiring the ratio of print operations performed based on changed default print settings to print operations performed based on default print settings (alternatively, it is feasible to calculate the ratio of print operations performed based on changed default print settings after acquiring the print ratio of the application), and output calculated results. Further, it is feasible to calculate the print ratio for each application after determining uselessness or usefulness of each reprinted job (alternatively, it is feasible to calculate the useless reprint rate after acquiring the print ratio for the application), and output calculated results. Further, it is feasible to calculate a combination including useless reprint, useful reprint, ratio of changed default print settings, and print ratio for each application, and output calculated result. Further, it is feasible to output the above-mentioned results for each user.

The configurations and contents of the above-mentioned various data are not limited to the above-mentioned examples and can be modified into various ways.

Although the present invention has been described with reference to a limited number of exemplary embodiments, the present invention can be embodied flexibly, for example, as a system, an apparatus, a method, a program, or a storage medium. Further, the present invention can be applied to a system composed of a plurality of devices or can be applied to an apparatus constituted by a single device.

Further, the present invention encompasses any configuration obtainable by combining at least two of the above-mentioned exemplary embodiments.

The present invention is not limited to the above-mentioned embodiments and can be modified in various ways (for example, in such a way as to functionally combine respective exemplary embodiments) based on the gist of the present invention, without departing from the scope of the present invention. Namely, the present invention encompasses every possible combination that can be obtained based on each exemplary embodiment described above and a modified embodiment thereof.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-017298 filed Jan. 31, 2013, which is hereby incorporated by reference herein in its entirety.

What is claimed is:

1. A management server, comprising:
a detection unit configured to detect a pair of reprint-related jobs by analyzing a job log collected from a printing apparatus;
a determination unit configured to determine whether a job is useless or useful for the pair of jobs detected by the detection unit and further determine which one of a plurality of categories the determined useless job should be classified into;
a counting unit configured to count, according to a determination result obtained by the determination unit, the total number of useless jobs and the total number of printed sheets of the useless jobs for each of plurality of categories; and
an output unit configured to output a result counted by the counting unit according to the determination result,
wherein if a detection result obtained by the detection unit indicates a pair of jobs, in which one job has been executed based on default print settings and the other job has been re-executed based on changed print settings, the determination unit determines the job executed based on the default print settings as a useless job.

2. The management server according to claim 1, wherein the detection unit is configured to detect a pair of jobs that are identical in the number of logical pages and identical in any one of job name and print user as the pair of reprint related jobs.

3. The management server according to claim 1, wherein the determination unit is configured to classify the useless job into a category of jobs executed based on default print settings or a category of jobs executed based on changed default print settings.

4. The management server according to claim 1, wherein if the reprint related jobs constituting the pair detected by the detection unit are different in any one of two-sided setting, imposition setting, and paper size, the determination unit is configured to determine an old job that is older in processing date and time compared to the other of the detected pair as a useless job.

5. The management server according to claim 1, wherein if the reprint related jobs constituting the pair detected by the detection unit are different in number of copies and identical in two-sided setting and imposition setting, the determination unit is configured to determine an old job that is older in processing date and time compared to the other of the detected pair as a useful job.

6. The management server according to claim 1, wherein if the reprint related jobs constituting the pair detected by the detection unit are identical in two-sided setting, imposition setting, and paper size and different in number of copies, the determination unit is configured to determine an old job that is older in processing date and time compared to the other of the detected pair as a useful job.

7. The management server according to claim 1, wherein the counting unit is configured to calculate a ratio of the total number of jobs or the total number of printed sheets printed based on the default print settings included in the job log to the total number of jobs or the total number of printed sheets included in the job log, in a designated analysis target period of time.

8. The management server according to claim 7, wherein if there is a plurality of default print settings because of any change in setting contents having occurred during the designated analysis target period of time, the counting unit is configured to calculate the ratio for each period of time in which the default print settings have changed.

9. A method for controlling a management server that collects a job log from a printing apparatus, the method comprising:
  detecting a pair of reprint-related jobs by analyzing the collected job log;
  determining whether a reprinted job is useless or useful for the detected pair of jobs and further determining which one of a plurality of categories the determined useless job should be classified into;
  counting, according to a determination result obtained, the total number of useless jobs and the total number of printed sheets of the useless jobs for each of the plurality of categories; and
  outputting a result counted according to the determination result,
  wherein if a detection result indicates a pair of jobs, in which one job has been executed based on default print settings and the other job has been reprinted based on changed print settings, the job executed based on the default print setting is determined as a useless job.

* * * * *